Sept. 12, 1944.   H. G. HOLMES   2,358,010
HEADLIGHT TESTER
Filed March 3, 1941   5 Sheets-Sheet 1
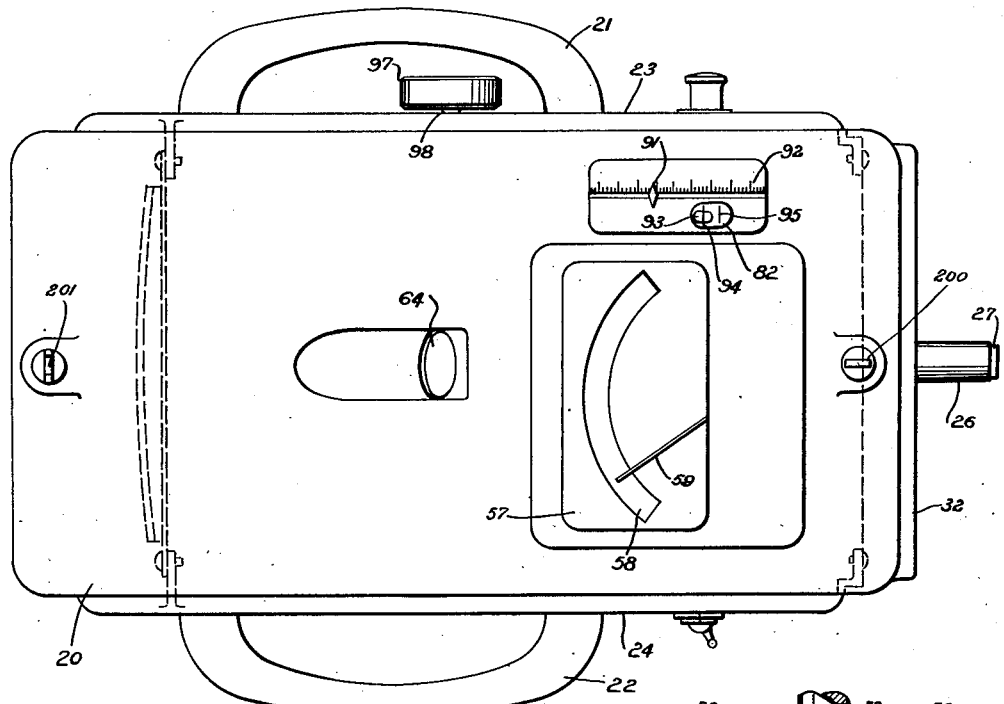
FIG_1_
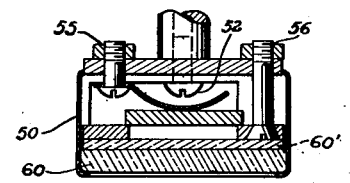
FIG_4_
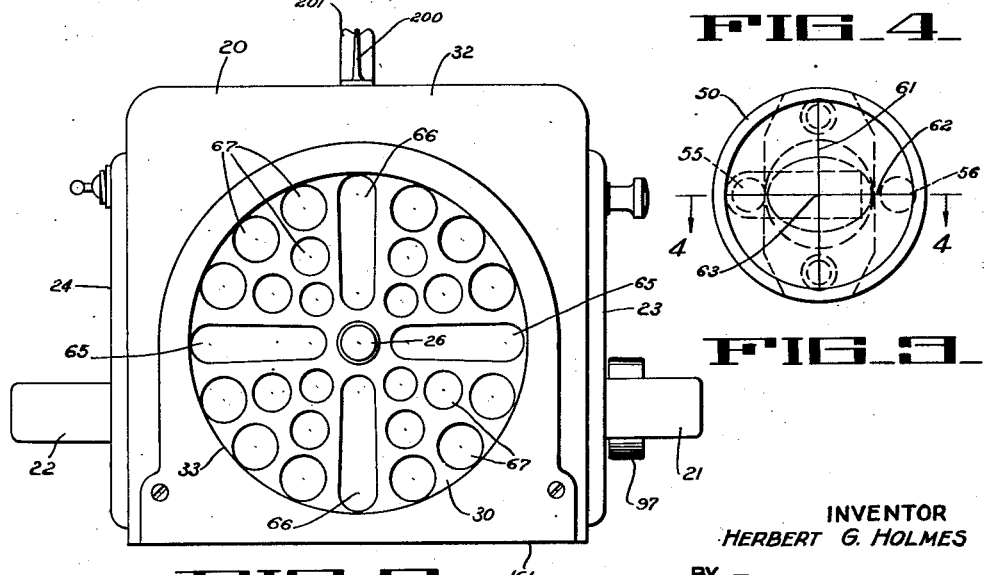
FIG_2_
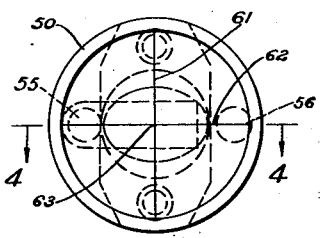
FIG_3_
INVENTOR
HERBERT G. HOLMES
BY Philip A. Minnis
ATTORNEY

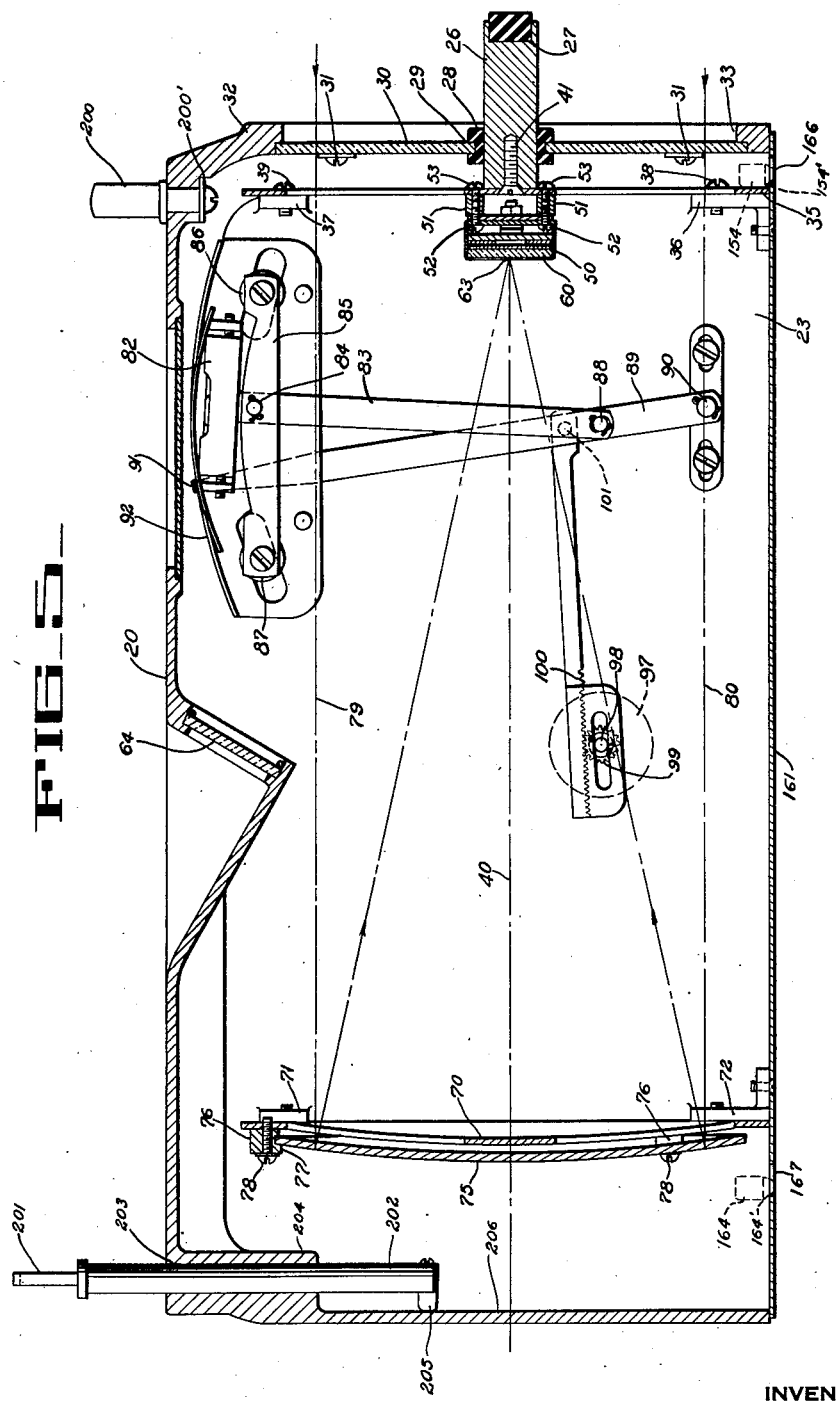

Sept. 12, 1944.   H. G. HOLMES   2,358,010
HEADLIGHT TESTER
Filed March 3, 1941   5 Sheets-Sheet 3
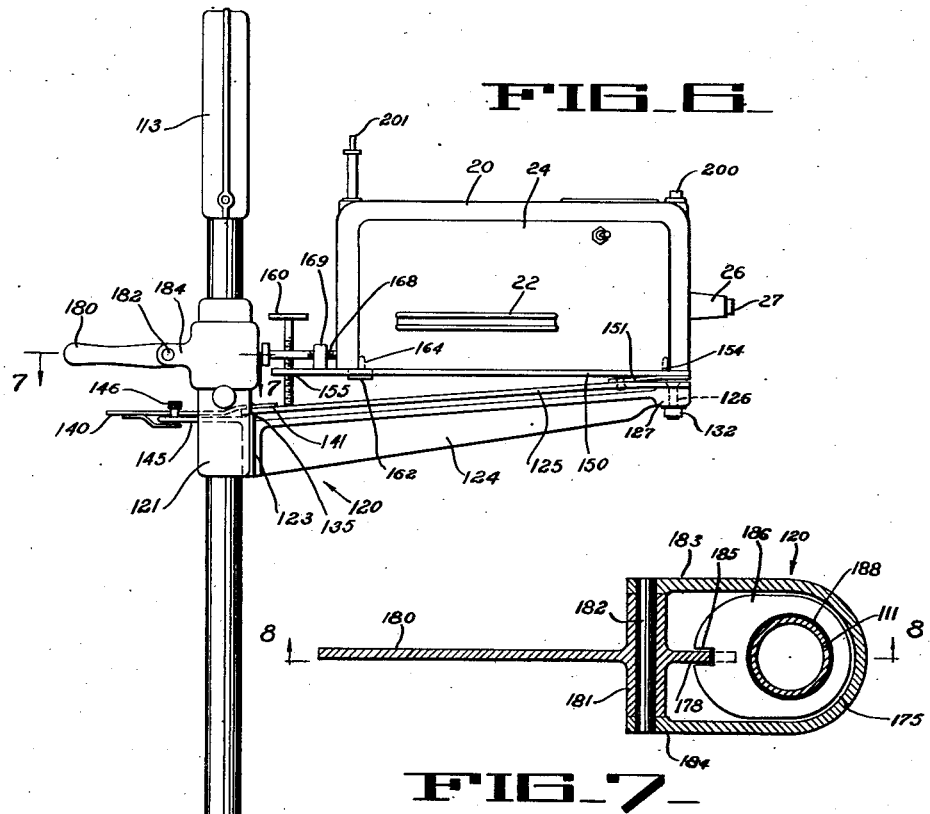
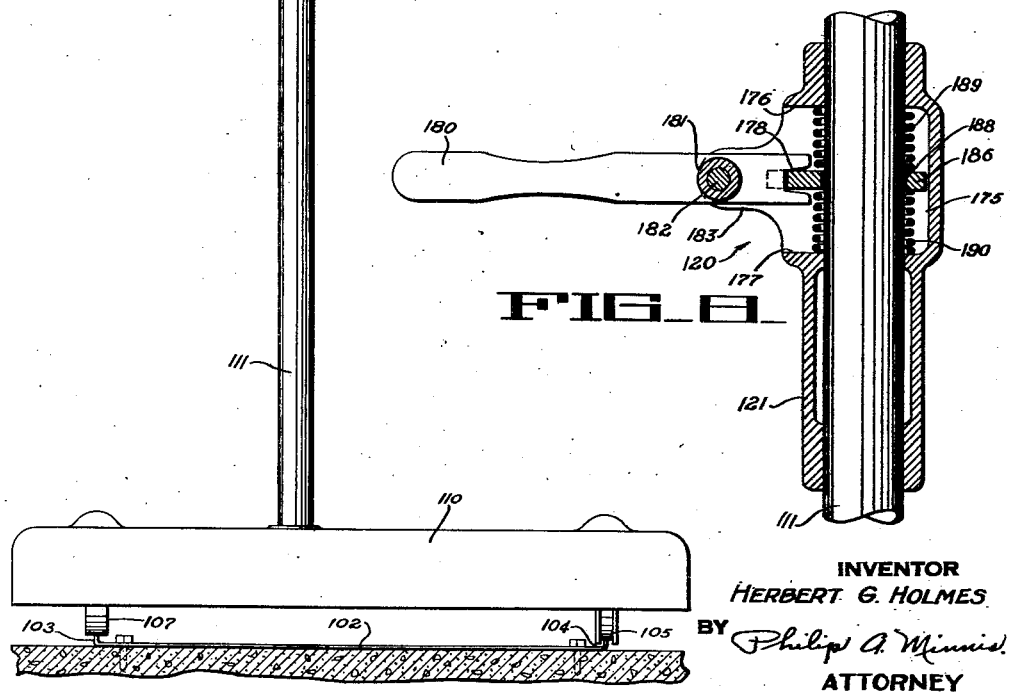
INVENTOR
HERBERT G. HOLMES
ATTORNEY Sept. 12, 1944.  H. G. HOLMES  2,358,010
HEADLIGHT TESTER
Filed March 3, 1941  5 Sheets-Sheet 4
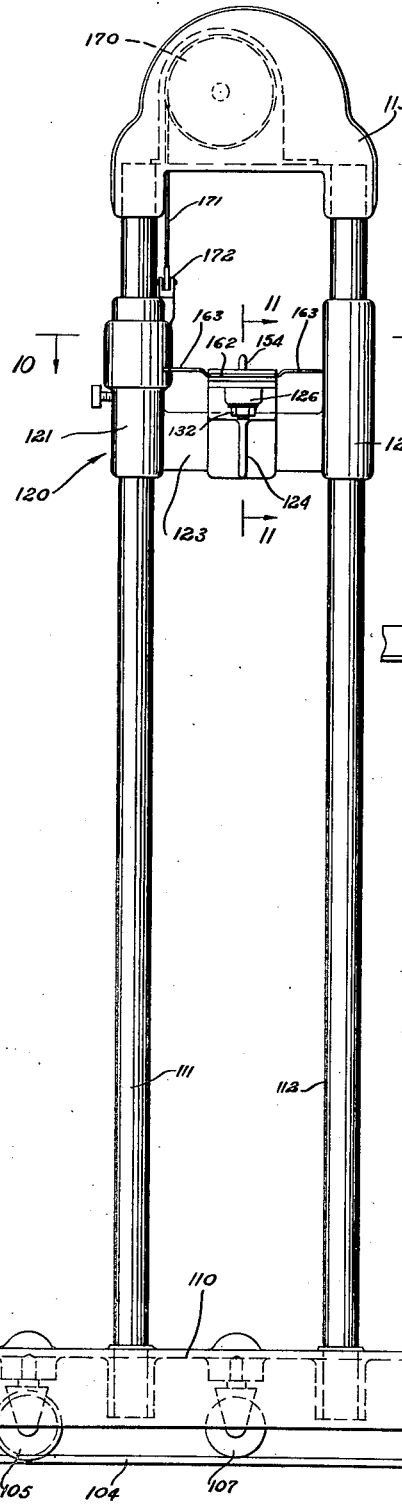
INVENTOR
HERBERT G. HOLMES
BY *Philip G. Minnis*
ATTORNEY Sept. 12, 1944.  H. G. HOLMES  2,358,010
HEADLIGHT TESTER
Filed March 3, 1941  5 Sheets-Sheet 5
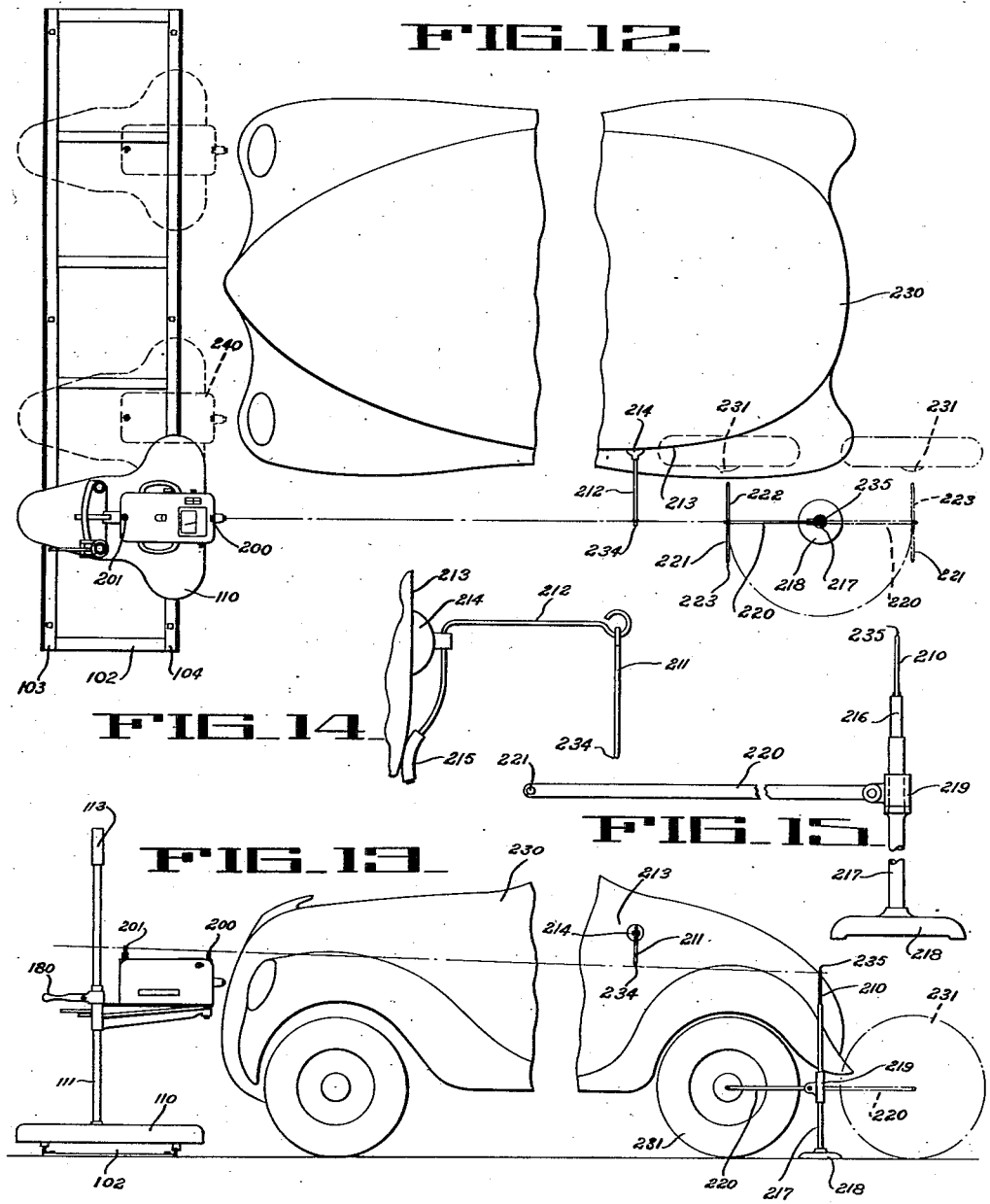
INVENTOR
HERBERT G. HOLMES
BY Philip G. Minnis
ATTORNEY Patented Sept. 12, 1944

2,358,010

UNITED STATES PATENT OFFICE 2,358,010

HEADLIGHT TESTER

Herbert G. Holmes, Lansing, Mich., assignor to Food Machinery Corporation, San Jose, Calif., a corporation of Delaware Application March 3, 1941, Serial No. 381,455

9 Claims. (Cl. 88—14)

This invention relates to apparatus for testing the headlights of automotive vehicles.

It is periodically necessary to test the headlights of automobiles to determine whether they conform to certain requirements enforced by law for the public safety on the highway. The factors to be determined are the intensity of the light emitted by each lamp, and the aim of its beam, as measured by the vertical and horizontal inclinations of the beam direction to the line of travel of the vehicle.

The principal object of this invention is to provide improved apparatus for determining the aim of the headlight beam, as well as its intensity.

It is an object to provide an instrument adapted to be placed in the beam and to indicate when the longitudinal axis of the instrument is aligned with the rays of the beam whereby the instrument axis will represent the directional line of the beam.

Another object is to provide means to facilitate the positioning of the instrument axis in alignment with the beam so that the headlights may be tested quickly and accurately.

Another object is to provide an instrument having a light-sensitive cell with a means for directing rays from the beam onto the cell which is accurate in operation and susceptible of efficient and economical manufacture.

Another object is to provide a visual means for focusing the rays on the light-sensitive cell to facilitate rapid adjustment of the instrument and to serve as a safety check in the use of the instrument.

Other objects will appear after the disclosure of an apparatus in which the invention has been embodied.

In the drawings:

Fig. 1 is a plan view of the headlight testing instrument.

Fig. 2 is a front elevation thereof.

Fig. 3 is a front elevation of the light-sensitive cell which is located within the instrument.

Fig. 4 is a section of the cell taken as indicated by the arrows 4—4 in Fig. 3.

Fig. 5 is a vertical section through the longitudinal axis of the instrument.

Fig. 6 is a side elevation of the stand with the instrument in place thereon.

Fig. 7 is a fragmentary section taken as indicated by the arrows 7—7 in Fig. 6.

Fig. 8 is a vertical section taken as indicated by the arrows 8—8 in Fig. 7.

Fig. 9 is a front elevation of the stand with the instrument removed therefrom.

Fig. 10 is a horizontal section taken as indicated by the arrows 10—10 in Fig. 9.

Fig. 11 is a fragmentary vertical section taken as indicated by the arrows 11—11 in Fig. 9.

Fig. 12 is a plan view of an automobile in position for testing its headlights by means of the apparatus.

Fig. 13 is a side elevation of the same.

Figs. 14 and 15 are detail views of instrumentalities employed in determining the line of travel of the automobile, Fig. 14 showing a device attached to the side of the vehicle and Fig. 15 showing a stand which is placed on the ground alongside the vehicle.

The headlight testing instrument comprises a box-like case 20 (Fig. 1) having handles 21, 22 attached to the left and right side walls 23 and 24, respectively. A post 26 projects forwardly from the front end of the instrument.

As shown in Fig. 5, the post 26 has a rubber button 27 in the forward end, which, under certain conditions of operation later to be described, is brought into contact with the lens of the headlight. The post 26 extends rearwardly through a rubber bushing 28 fitted in a central aperture 29 of a glass plate 30, which is attached by means of screws 31 to the front wall 32 of the case 20. The glass plate 30 is circular in shape and serves as a window for the large circular aperture 33 (Figs. 2 and 5) in the front wall 32 through which light from the headlight beam enters the instrument.

Behind the glass plate 30 is a diaphragm 35 which is rigidly mounted in the case 20 by attachment to lugs such as 36, 37 by screws 38, 39. The lugs 36, 37 are formed integrally with the side wall 23 of the case. A similar pair of lugs is formed on the right side wall 24 for attaching the right side of the diaphragm 35 thereto. The mounting lugs in the case serve to accurately position the diaphragm 35 so that it lies in a plane perpendicular to the longitudinal axis 40 of the instrument. The post 26 is attached to the diaphragm 35 by means of a screw 41 and is located with its axis coincident with the longitudinal axis 40.

A light-sensitive cell 50 is mounted on the rear side of the diaphragm 35 by means of spacers 51 threaded to receive screws 52 and 53 which pass through the base of the cell and the diaphragm, respectively. The cell 50 is of the dry disc type which is self-generating in that when exposed to light an electromotive force is generated between the plates of the cell which can be measured with a suitable meter. The two terminals of the cell 50 are shown at 55 and 56 (Fig. 4), and these terminals are connected by suitable wiring (not shown) to a microammeter 57 (Fig. 1) having a scale 58 and pointer 59. A translucent glass plate 60 (Fig. 4) is employed as the window of the cell 50. On account of the wide variation in output of photoelectric cells of this type it is sometimes necessary to employ a thin sheet 60' of translucent plastic material as a filter. The plate 60 is also used as a target, and for this purpose is provided with vertical and horizontal lines 61, 62 (Fig. 3) on the front face thereof which indicate the center of the target and cell by their intersection 63. The point 63 is located on the longitudinal axis 40 (Fig. 5). The target 60 is visible to the operator through a window 64 in the top of the case 20.

Means are provided for selecting rays from the headlight beam and focusing them on the target 60. The front diaphragm 35 is provided with a plurality of apertures as shown in Fig. 2 for admitting light rays from selected portions of the headlight beam. These comprise two horizontal slots 65, two vertical slots 66 and a plurality of round apertures 67 disposed as shown in the spaces between the slots. At the rear of the instrument a second diaphragm 70 (Fig. 5) is rigidly mounted in the case 20 by attachment to lugs such as 71, 72 formed in the side walls. The rear diaphragm 70 is provided with apertures identical to the apertures in the front diaphragm 35, and the diaphragm 70 is mounted so that its apertures are in longitudinal alignment with the apertures of the front diaphragm. By this arrangement light rays passing through the apertures of diaphragm 35 and which are at least approximately parallel to the longitudinal axis 40 of the instrument may pass through the rear apertures to light collecting means, preferably a concave mirror 75, while a large percentage of angular rays which tend to diffuse the light incident upon the mirror are cut off. The only difference between the two diaphragms is that the rear diaphragm is concave.

The concave mirror 75 is mounted behind the rear diaphragm 70 by means of mounting members 76 which are suitably formed at 77 to receive the edge of the mirror 75 and are attached to the rim of the diaphragm 70 by means of screws 78. The curvature of the mirror 75 is such that the center 63 of the target 60 is the focal point of the mirror, and the axis of the mirror 75 is coincident with the longitudinal axis 40. It will also be observed that the light rays of the headlight beam which reach the mirror through the apertures of the diaphragm 70, are reflected through the same apertures upon the target 60.

The operation of the instrument in determining the line of direction of the headlight beam is as follows: The operator supports the instrument in his hands by grasping the handles 21, 22 (Fig. 1). He presses the rubber button 27 into contact with the center of the headlight lens. The instrument is now disposed in the path of the beam so that the light will enter the instrument through the window 30 in the front wall thereof. Rays such as 79, 80 which pass through aligned apertures in the front and rear diaphragms 35, 70, respectively, strike the mirror 75 and are reflected thereby to the target 60. Part of the light received on the target 60 is transmitted to the cell 50 and part of it is reflected to form an image of the spot of light which is visible to the operator through the window 64.

Maintaining the rubber button 27 in engagement with the headlight lens the operator moves the instrument back and forth and up and down, as he observes the meter 57. When the longitudinal axis 40 is in alignment with the beam of the headlight, the rays of the beam will pass through the diaphragms parallel to the axis 40 and will be focused on the target 60 by the mirror 75. This condition is indicated to the operator by the maximum reading on the meter 57. The scale 58 of the meter 57 is calibrated in candlepower so that the maximum reading thereon indicates the intensity of light emitted by the headlight and the operator can thus observe whether it is within the required limits.

The vertical aim of the headlight beam is determined by mechanism which measures the angle of inclination of the instrument axis 40 to the horizontal. A spirit level 82 (Fig. 5) is rigidly mounted on the upper end of a lever 83 which is mounted on a pivot 84 in a fixed bracket 85 rigidly mounted on the side wall 23 of the case by means of posts 86, 87. The lower end of the lever 83 is connected at 88 to a pointer 89 which oscillates on a pivot 90. The tip 91 of the pointer moves over a scale 92 (Fig. 1). The spirit level 82 is disposed adjacent the scale 92 and has the usual bubble 93 which when centered between the lines 94, 95 is an indication that the level 82 is in a true horizontal position.

The vertical aim adjusting knob 97 is disposed within the left handle 21. The shaft 98 on which the knob is mounted extends through the side wall 23 into the interior of the case where it has secured thereon a pinion 99 (Fig. 5). A rack 100 is actuated by the pinion 99 and is an integral part of a link which is connected at 101 to the pointer 89. For a more detailed disclosure of the vertical aim mechanism reference is to be had to my application Serial No. 341,178, filed June 18, 1940.

The operation of the vertical aim measuring device is as follows: When the longitudinal axis 40 of the instrument is in a true horizontal position and the knob 97 is adjusted to center the bubble 93 in the spirit level 82, the pointer 91 will be opposite the zero point on the scale 92 and opposite the bubble 93 and intermediate the index lines 94, 95. When the instrument axis 40 is inclined to the horizontal and the knob 97 is turned to center the bubble 93, the pointer 91 will be removed from its central position an amount indicated by the scale 92. The scale 92 is graduated to indicate the elevation of the beam above or below the horizontal in inches at a distance of twenty-five feet from the headlight.

The operator may determine the vertical aim of the headlight while holding the instrument with its longitudinal axis in line with the beam direction as previously explained, by adjusting the vertical aim knob with his left thumb to center the bubble 93 between the index lines 94, 95, and thereafter reading the scale 92.

In order to determine the horizontal aim, as well as the vertical aim, I provide apparatus, including a stand for supporting the instrument, which will now be described. As shown in Fig. 6, the instrument is mounted on a stand adapted to run on a track 102 (Fig. 12) which has parallel rails 103, 104. Flanged rollers 105, 106 (Fig. 9) engage the rail 104 and a roller 107 (Figs. 6 and 9) engages the rail 103. The three rollers 105, 106, 107 are suitably mounted in the base 110 of the stand. Two parallel columns 111 and 112 (Fig. 9) are rigidly secured at their lower ends in the base 110 and rise vertically therefrom. The upper ends of the columns are interconnected by means of a yoke casting 113.

A support indicated generally at 120 (Figs. 6 and 9) is vertically adjustable on the columns 111 and 112. The support 120 has two bearing portions 121, 122 which provide sliding bearings for the support 120 on the columns 111, 112. The bearing portions 121, 122 are interconnected by a transverse web 123 cast integrally therewith. Extending forwardly from the web 123 and cast integrally therewith is an arm 124.

The horizontal aim bar 125 (Fig. 6) is mounted on the arm 124 for swinging movement in a horizontal plane by means of a vertical pivot 126. As shown in detail in Fig. 11, a boss 127 is formed in the front end of the arm 124. This boss has a vertical bore 128 and a counterbore 129. The pivot pin 130 fits in the bore 128 and is riveted to the horizontal aim bar 125 at 131. The lower end of the pivot pin 130 is threaded to receive a nut 132. A compression spring 133 is interposed between the nut and the shoulder of the counterbore 129. The pivot pin 130 which is rigidly attached to the bar 125 is free to rotate in the bore 128 and the spring 133 holds the under side of the bar 125 against the upper face 134 of the boss 127.

The rear end of the horizontal aim bar 125 (Fig. 6) rests upon an upstanding rib 135, formed on the web 123 of the support 120, and is free to slide back and forth thereon as the bar turns about its pivot 126. A handle 140 for swinging the bar 125 is rigidly attached thereto at 141. As shown in Fig. 10, the handle 140 has a window 142 therein provided with a cross hair 143 for indicating the position of the horizontal aim bar relative to an arcuate scale 144. A ledge 145 formed integrally with the support 120 and projecting rearwardly from the web 123 (Fig. 6) supports the scale 144. For a purpose hereinafter explained, the scale 144 is made adjustable. It is attached to the ledge 145 by screws 146 (Fig. 6) and 147 (Fig. 10) provided with knurled clamping nuts. The screws pass through short arcuate slots, such as 148, formed in each end of the scale. When the nuts are loosened the scale can be adjusted by shifting it laterally and the adjustment can then be maintained by tightening the nuts.

The instrument supporting bar 150 (Fig. 6) is attached to the forward end of the horizontal aim bar 125 by means of a spring steel strap 151 which acts as a hinge. As shown in Figs. 10 and 11, the strap 151 is secured to the bar 150 by rivets 152 and to the bar 125 by rivets 153. Riveted to the bar 150 is a dowel pin 154. The rear end of the supporting bar 150 (Fig. 10) has a threaded aperture 155 which receives an adjusting set screw 160 (Fig. 6) which bears against the horizontal aim bar 125. Turning of the adjusting screw 160 causes the supporting bar 150 to rock on its hinge 151.

The headlight testing instrument previously described is adapted to be detachably mounted on the supporting bar 150 in a predetermined position. A supporting bracket 162 (Fig. 6) is rigidly secured to the under side of the bar 150. This bracket has laterally extending wings 163 (Figs. 9 and 10). The instrument is supported by the bar 150 and the wings 163. It is fixed in a predetermined position thereon by means of dowel pins. The front dowel pin 154 (Fig. 11) has already been referred to. The rear dowel pin 164 (Figs. 6 and 10) is rigidly secured in the bar 150 above the bracket 162. As shown in Fig. 5, the bottom 161 of the instrument case has two apertures 166, 167 into which the dowel pins fit. After the instrument has been positioned on the bar 150 (Fig. 6) with the dowel pins 154, 164 in the apertures 166, 167 (Fig. 5), the instrument is secured in place by a set screw 168 (Figs. 6 and 10) threaded through a post 169 which is rigidly mounted on the bar 150. When the set screw 168 is tightened the instrument is shifted forwardly on the bar 150 to engage the rear edges of the apertures 166, 167 (Fig. 5) under the shoulders 154', 164' on the dowel pins.

Means are provided to facilitate adjusting the instrument and its support vertically on the columns 111, 112 of the stand. To counterbalance the weight of the instrument and the support 120 (Fig. 9) a spring wound reel 170 is rotatably mounted in the yoke 113 at the top of the stand. A tape 171 attached to the reel and wound thereon is connected at 172 to the support 120. This enables the support 120 to be readily and easily slid up and down on the columns 111, 112.

In order to permit the operator to obtain fine adjustments the device shown in detail in Figs. 7 and 8 is provided. Formed integrally with the bearing portion 121 of the support 120 is an enclosure 175 having an upper wall 176 and a lower wall 177. This enclosure is open at the rear to permit the entrance of a jaw 178 formed on a lever 180. The lever 180 has a hub 181 bored to receive a pin 182 which is supported in ears 183, 184 formed integrally with the support 120.

The jaw 178 of the lever 180 enters a notch 185 (Fig. 7) formed in a plate 186 and is adapted to engage the plate on its top or bottom depending on whether the lever 180 is turned clockwise or counterclockwise, respectively, on its pivot 182 (Fig. 8). The plate 186 has a hole 188 therein which is larger in diameter than the column 111 which the plate encompasses. A compression spring 189 is interposed between the plate 186 and the upper wall 176 of the enclosure 175, and another compression spring 190 is interposed between the plate and the lower wall 177.

The operation of the fine adjustment device is as follows: Normally the parts occupy the positions shown in Fig. 8 where the two springs 189, 190 maintain the plate 186 horizontal. When the lever 180 is depressed the jaw 178 is tilted and the plate 186 crimped against the column and continued depression of the lever 180 causes the support to be moved downwardly, the jaw using the plate as a fulcrum. If the support cannot be lowered as far as desired with one movement of the lever it is released, whereupon the springs restore the parts to normal. The lever can then be depressed again and the plate will take a fresh grip on the column and the support can be lowered further. Conversely, the support can be raised by lifting the lever 180, in which case the plate is tilted the other way. The device is thus reversible in operation and permits very delicate adjustments of the support vertically on the columns.

In order to check the horizontal aim of the headlights I provide means for determining the line of travel of the vehicle and the relation of that line to the track. Mounted in the top of the instrument are front and rear sights 200, 201 (Fig. 6). As shown in Fig. 5, the front sight 200 is attached to the case by means of a screw and washer 200' which permits the front sight to be laterally adjusted at the factory for setting it in correct alignment. The rear sight is vertically adjustable. A pin 202 carrying the sight 201 is slidable in a bore 203 in a boss 204 formed in the case. At the lower end of the pin a small leaf spring 205 is attached which has frictional engagement with the rear wall 206 of the case to retain the sight 201 in any elevated position.

The front and rear sights 200, 201 are located in the vertical plane containing the longitudinal axis 40 of the instrument and are employed to align that axis with the line of travel of the vehicle by sighting on two pointers 210, 211 (Fig. 13). The pointer 211 (Fig. 14) is a pendulum rod suspended from an eye formed in the end of a supporting rod 212 which is adapted to be attached to the side 213 of the automobile by means of a suction cup 214. The rod 212 is bent downwardly and inwardly. The lower end is encased in rubber tubing 215 for contact with the side 213.

The pointer 210 (Fig. 15) is slidably received and frictionally held in a vertical tube 216 comprising part of a portable stand 217 having a base 218 which rests upon the floor. A sleeve 219 is rotatably mounted on the stand 217 and has attached thereto a horizontally-extending arm 220 which has a rod 221 secured in its outer end. As can be seen in Fig. 12, the rod 221 provides two pointers 222, 223 projecting perpendicularly from the arm.

The operation of testing the headlights will now be described. The automobile 230 (Fig. 12) is driven up to the track 102 so that the center line of the automobile is approximately at right angles to the track, and so that there is sufficient clearance between the headlight tester and the front end of the automobile to permit the tester stand to be rolled along the track in front of the automobile. The stand 217 is placed in the position shown in Figs. 12 and 13 with the pointer 222 opposite the rear hub cap 231. The arm 220 is swung around through one hundred eighty degrees to the position indicated in dot-and-dash lines. The automobile is rolled backward until the rear hub cap 231 is opposite the pointer 223.

The pendulum pointer 211 is now mounted on the side of the automobile by attaching the suction cup 214. The pendulum 211 is mounted so that it hangs directly over the pointer 210 in vertical alignment therewith. In this manner the point 234 of the pendulum pointer 211 is placed substantially in coincidence with the point 235 of the pointer 210. The arm 220 is then swung back to its original position and the automobile is moved forwardly to its original position where the rear hub cap 231 is again opposite the pointer 222. When the automobile is moved forwardly the pendulum pointer 211 is carried with it to the position shown, and the point 234 describes an imaginary line in space. If the automobile moved in a straight line the line of travel is represented by a line joining the points 234, 235. If for any reason the automobile moved along a curved path the point 234 described an arc of which, nevertheless, the line 234—235 is the chord, so that for the purpose of this test the line 234—235 is still representative of the line of travel of the automobile.

The instrument stand is moved to the full line position in Fig. 12 and the instrument is adjusted to bring the sights 200, 201 into line with the points 234, 235. Usually, because of the fact that the automobile does not travel in a line exactly at right angles to the track, it is necessary to swing the horizontal aim bar 125 (Fig. 10) by means of the handle 140 in order to bring the instrument sights into line with the pointers. After alignment of the sights the horizontal aim scale 144 is adjusted by loosening the nuts on the screws 146, 147 to bring the zero mark of the scale under the cross hair 143. Then the nuts are tightened to hold the scale in adjusted position. In this manner the angular relationship between the line of travel of the automobile and the track is determined and maintained throughout the test.

The stand is then rolled along the track to position the instrument in front of the left-hand headlight, as shown in broken lines at 240 in Fig. 12. The instrument is adjusted to bring its longitudinal axis 40 (Fig. 5) into line with the headlight beam where the spot of light will appear at the center of the target 60 and the meter 57 (Fig. 1) will give its maximum reading. To so position the instrument the following adjustments are available: Horizontal translation by rolling the stand on the track. Vertical translation by moving the support 120 (Fig. 6) on the columns 111, 112, fine adjustments being obtained by operating the lever 180. Tilting in a vertical plane is effected by turning the screw 160. Swinging in a horizontal plane is obtained by operating the handle 140 to turn the bar 125 about its pivot 126.

When the instrument has been positioned in line with the beam the horizontal aim is indicated by the cross hair 143 on the scale 144. The vertical aim is determined, as previously explained, by turning the knob 97 (Fig. 1) until the bubble 93 is centered between the marks 94, 95. The vertical aim is then indicated by the pointer 91 on the scale 92. After the left-hand headlight has been tested the stand is rolled along the track to position the instrument in front of the right-hand headlight and the procedure for testing the beam is repeated.

Having thus described my invention and in what manner the same may be used, what I claim as new and desire to protect by Letters Patent is:

1. An apparatus for determining the direction of a headlight beam comprising a pair of diaphragms for positioning in front of a headlight, said diaphragms being arranged one behind the other and provided with aligned apertures, whereby to separate parallel shafts of light from said beam and permit the passage of said shafts therethrough, light intensity indicating means, and a concave mirror arranged to receive said parallel shafts of light and focus them onto said intensity indicating means, said diaphragms shielding said mirror and indicating means from the remaining rays of said headlight beam.

2. An apparatus for determining the direction of a headlight beam comprising a diaphragm for positioning in front of a headlight, a concave diaphragm arranged behind said first diaphragm, said diaphragms being provided with a plurality of aligned apertures for selecting parallel shafts of light from said beam and permitting the passage of said shafts therethrough, light intensity indicating means, a concave mirror adjacent said concave diaphragm arranged to receive said parallel shafts of light and focus them onto said indicating means, said diaphragms shielding said mirror and indicating means from the remaining rays of the headlight beam.

3. An apparatus for determining the direction of a headlight beam comprising a diaphragm for positioning in front of a headlight, a concave diaphragm behind said first diaphragm, said diaphragms being provided with a plurality of aligned apertures for selecting parallel shafts of light from said beam and permitting the passage of said shafts therethrough, light intensity indicating means intermediate said diaphragms, a concave mirror behind said concave diaphragm arranged to receive said parallel shafts of light and focus them through the apertures in said concave diaphragm onto said indicating means, said diaphragms shielding said mirror and indicating means from the remaining rays of said headlight beam.

4. An apparatus for determining the direction of a headlight beam comprising means adapted to be placed in front of a headlight and providing a plurality of aligned apertures whereby to separate parallel shafts of light from said beam and permit the passage of said shafts therethrough, light intensity indicating means positioned in advance of at least one of said apertures, and light collecting and directing means arranged to receive said parallel shafts of light and to direct and focus the same onto said intensity indicating means, said light collecting and directing means being so positioned adjacent said aperture providing means that light rays reaching said collecting and directing means through an aperture in said aperture providing means are directed back through the same aperture.

5. An apparatus for determining the direction of a headlight beam comprising means adapted to be placed in front of a headlight and providing a plurality of aligned apertures whereby to separate parallel shafts of light from said beam and permit the passage of said shafts therethrough, light intensity indicating means positioned in advance of at least one of said apertures, light collecting and directing means arranged to receive said parallel shafts of light and focus them onto said intensity indicating means, said light collecting and directing means being so positioned adjacent said aperture providing means that light rays reaching said collecting and directing means through an aperture in said aperture providing means are directed back through the same aperture, and means for shielding said light collecting and directing means and said intensity indicating means from the remaining rays of said headlight beam.

6. An apparatus for determining the direction of a headlight beam comprising light collecting and directing means, means adapted to be placed in front of a headlight and providing a plurality of aligned apertures arranged for selecting from said beam separate shafts of light parallel to the axis of said light collecting and directing means and for directing said shafts to said light collecting and directing means, and light intensity indicating means on the optical axis of the light collecting and directing means positioned in advance of at least one of the apertures of said aperture providing means for receiving said shafts of light focused thereon by said light collecting and directing means, said light collecting and directing means being so positioned adjacent said aperture providing means that light rays reaching said collecting and directing means through an aperture in said aperture providing means are directed back through the same aperture.

7. An apparatus for determining the direction of a headlight beam comprising a pair of spaced diaphragms provided with aligned apertures for separating parallel shafts of light from said beam and to permit passage of said shafts therethrough, light intensity indicating means positioned in advance of at least one of said diaphragms, and light collecting and directing means for receiving said shafts of light and for directing and focusing the same upon said light intensity indicating means.

8. An apparatus for determining the direction of a headlight beam comprising a pair of spaced diaphragms provided with aligned apertures for separating parallel shafts of light from said beam and to permit passage of said shafts therethrough, light intensity indicating means in advance of at least one of said diaphragms, light collecting and directing means behind said diaphragms for receiving said shafts of light and for directing and focusing the same upon said light intensity indicating means, and means for shielding the light collecting and directing means and said intensity indicating means from the remaining rays of the headlight beam.

9. An apparatus for determining the direction of a headlight beam comprising light collecting and directing means, means adapted to be placed in front of a headlight and providing a plurality of aligned apertures for selecting parallel shafts of light from said beam and for admitting them to said collecting and directing means, and light intensity indicating means disposed in advance of at least one of the aligned apertures of said aperture providing means for receiving said shafts of light from said light collecting and directing means, said light collecting and directing means being so positioned adjacent said aperture providing means that light rays reaching said collecting and directing means through an aperture in said aperture providing means are directed back through the same aperture.

HERBERT G. HOLMES.